(12) United States Patent
Hilbert (10) Patent No.: US 6,616,097 B2
(45) Date of Patent: Sep. 9, 2003

(54) RECONFIGURABLE RECONNAISSANCE POD SYSTEM

(75) Inventor: Andrea A. Hilbert, Mechanicsville, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/977,461

(22) Filed: Oct. 15, 2001

(65) Prior Publication Data

US 2003/0071170 A1 Apr. 17, 2003

(51) Int. Cl.[7] .................................................. B64C 1/00
(52) U.S. Cl. .................................. 244/118.1; 244/118.2
(58) Field of Search .................... 244/118.1, 118.2, 244/137.1, 137.4, 129.1, 129.5; 89/1.54, 1.58, 1.59, 37.16, 37.17, 37.21, 37.22; 348/117, 144; 250/334, 203.1, 203.7, 234

(56) References Cited

U.S. PATENT DOCUMENTS

| | | | | |
|---|---|---|---|---|
| 3,689,012 A | * | 9/1972 | Liston | |
| 4,114,839 A | * | 9/1978 | Sibley et al. | |
| 4,162,776 A | * | 7/1979 | Sibley et al. | |
| 4,191,244 A | * | 3/1980 | Keske | |
| 4,746,082 A | * | 5/1988 | Syms et al. | |
| 4,949,917 A | * | 8/1990 | Cottle et al. | |
| 5,154,308 A | * | 10/1992 | Larson | |
| 5,191,370 A | * | 3/1993 | Bozzolato | |
| 5,531,403 A | * | 7/1996 | Tyler | |
| 5,927,648 A | * | 7/1999 | Woodland | |
| 6,378,387 B1 | * | 4/2002 | Froom | |
| 6,422,508 B1 | * | 7/2002 | Barnes | |

FOREIGN PATENT DOCUMENTS

DE        3417917        * 11/1985 .............. 244/118.1

* cited by examiner

*Primary Examiner*—Tien Dinh
(74) *Attorney, Agent, or Firm*—Ron Billi (57) ABSTRACT

A sensor-carrying pod which has middle and readily detachable end sections. The end sections are chosen from a suite of different end sections, depending upon the sensors used in a mission. The sections may include panels, or windows specifically transmissive to predetermined wavelengths, such as visible and IR. A deployment arrangement allows the pod to move horizontally and vertically, from an aircraft, into the airstream, and back again after a mission. The door of the aircraft is sealed around a component of the deployment arrangement to allow for pressurization of the aircraft for high altitude reconnaissance missions.

16 Claims, 8 Drawing Sheets

RECONFIGURABLE RECONNAISSANCE POD SYSTEM

STATEMENT OF GOVERNMENT INTEREST

The invention described herein may be manufactured and used by or for the Government of the United States of America for government purposes without the payment of any royalties therefor.

BACKGROUND OF THE INVENTION

When an aircraft is scheduled to embark on a reconnaissance mission it is outfitted with one or more sensors to accomplish the particular mission. In one scenario the sensors are carried in one or more pods which are hard mounted to points on the outside of the aircraft, typically located on the wing, nose or belly of the aircraft. With this configuration, access to the pods while in flight is practically impossible. Any change in sensors, due to a mission change, for example, would require the aircraft to return to base for a changeover.

An alternative approach would be to have a fleet of aircraft, each with a different sensor suite arrangement. This approach, however, is rather expensive in initial purchasing and subsequent maintenance of the equipment. In addition, each aircraft would have to be modified to install a pod, or pods, and would restrict the particular aircraft to one or two different mission types. If the type of mission is no longer required, the aircraft may have to be modified to accommodate another type of mission.

A sensor pod may be carried in a large aircraft and deployed when approaching a particular area to be surveyed, and retrieved back into the aircraft after the mission. In general, a change in mission while in flight would require a return to base since such systems are not reconfigurable in the air. In addition, when the sensor pod is deployed out the door of the aircraft, the aircraft cannot be pressurized, so as to attain higher altitudes, without significant structural modifications to the aircraft.

It is a primary object of the present invention to provide a reconnaissance pod system which can accommodate various sensors operating at different wavelengths, with the capability of changing sensors in flight. Further, the apparatus can be deployed at low altitudes and the aircraft may then proceed to higher altitudes, and be pressurized, with minor, or no modifications to the carrying aircraft.

SUMMARY OF THE INVENTION

A reconfigurable reconnaissance pod system of the present invention is adapted to be carried by an aircraft and includes a pod having an interior for placement of one or more sensors, selected from a suite of sensors. The pod structure includes a middle section and first and second end sections connectable with the middle section, and selected from a suite of end sections as a function of particular sensors used within said pod. The middle section includes at least one window aperture into which is placed an insert, selected from a suite of inserts as a function of particular sensors used within said pod. At least some of said suite of end sections are selected from the group including a) end sections having a window to transmit wavelengths in the visible portion of the spectrum, b) end sections having a window to transmit wavelengths in the invisible portion of the spectrum and c) end sections having no window. A deployment arrangement is included for deploying and retrieving the pod from the aircraft.

BRIEF DESCRIPTION OF THE DRAWINGS

The invention will be better understood, and further objects, features and advantages thereof will become more apparent from the following description of the preferred embodiments, taken in conjunction with the accompanying drawings, in which.

DETAILED DESCRIPTION OF THE PREFERRED EMBODIMENTS

In the drawings, which are not necessarily to scale, like or corresponding parts are denoted by like or corresponding reference numerals.

Figure 1:
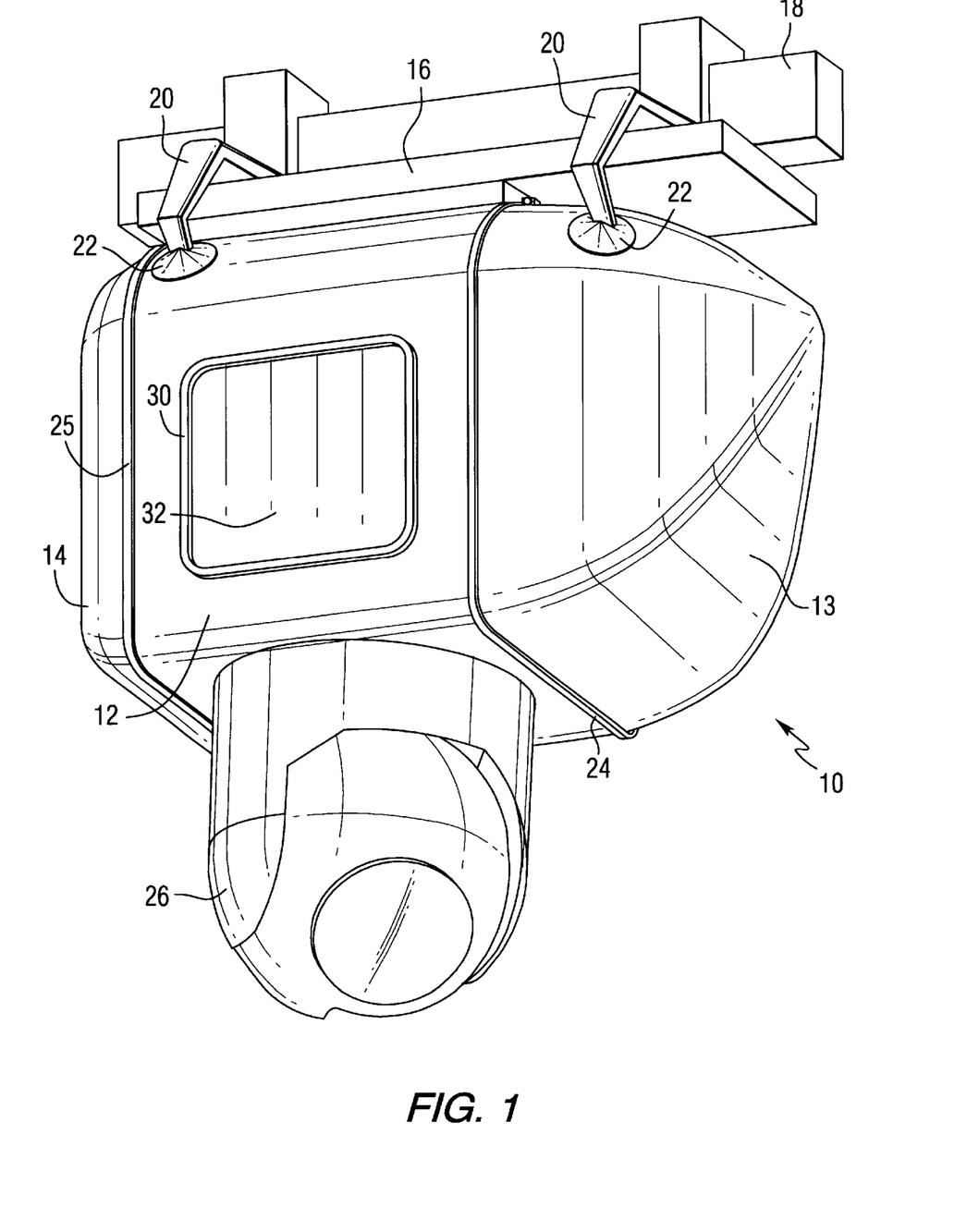
FIG. 1 is a view of one embodiment of a pod in accordance with the present invention.

In FIG. 1, pod 10 includes a middle section 12, and first and second end sections 13 and 14, collectively defining an interior for carrying one or more sensors, selected from a suite of sensors designed for various missions. These sections may be fabricated from a lightweight metal such as aluminum or a composite material, by way of example. Middle section 12 is secured to a strongback member 16, which is carried by a mounting yoke 18 having a plurality of depending arms 20 which straddle the pod and cushion it by means of cushioning elements 22. End sections 13 and 14 are easily attached and detached by means of clamping ring arrangements 24 and 25. In the embodiment of FIG. 1, a turret 26 is mounted to the bottom of the pod 10 for carrying a sensor, or optical system for a sensor within the pod.

Some sensors in the suite of sensors may operate in the visible portion of the spectrum, while others may operate in the IR portion. These different sensors require different apertures, or windows, of different transparent materials for the transmission of the particular electromagnetic energy. The middle section 12 includes, on either side, a frame 30, which has a removable panel 32, to allow for the insertion of such different transparent windows. Although panel 32 itself is not transparent to visible or IR energy, it is transparent to radar frequencies.

End sections 13 and 14 are selected from a suite of end sections which include end sections having a window to transmit visible light, end sections having a window to transmit invisible light, and end sections having no window. In the exploded view of FIG. 2, the top of middle section 12 can be seen as including a series of holes 40 for insertion of fasteners for mounting to the strongback 16 illustrated in FIG. 1. Middle section 12 includes transparent windows 42 and 43 on either side thereof, and end sections 13' and 14' include respective transparent windows 44 and 45, each for the selective transmission of either IR or visible light.

Various end sections may be connected to the middle section 12 quickly and with facility by the quick disconnect clamping ring arrangements 24 and 25. More particularly, and with additional reference to the cross-sectional view of FIG. 2A, the clamping ring arrangement 24 includes a former ring 50 affixed to end section 13', and having an upstanding flange 51. A complementary former ring 52 is affixed to middle section 12, and includes an upstanding flange 53. A U-shaped clamp 54 completely surrounds the upstanding flanges 51 and 53 and draws them, and consequently the middle and end sections 12 and 13', together when bolt 55 is tightened.

Figures 2, 2A:
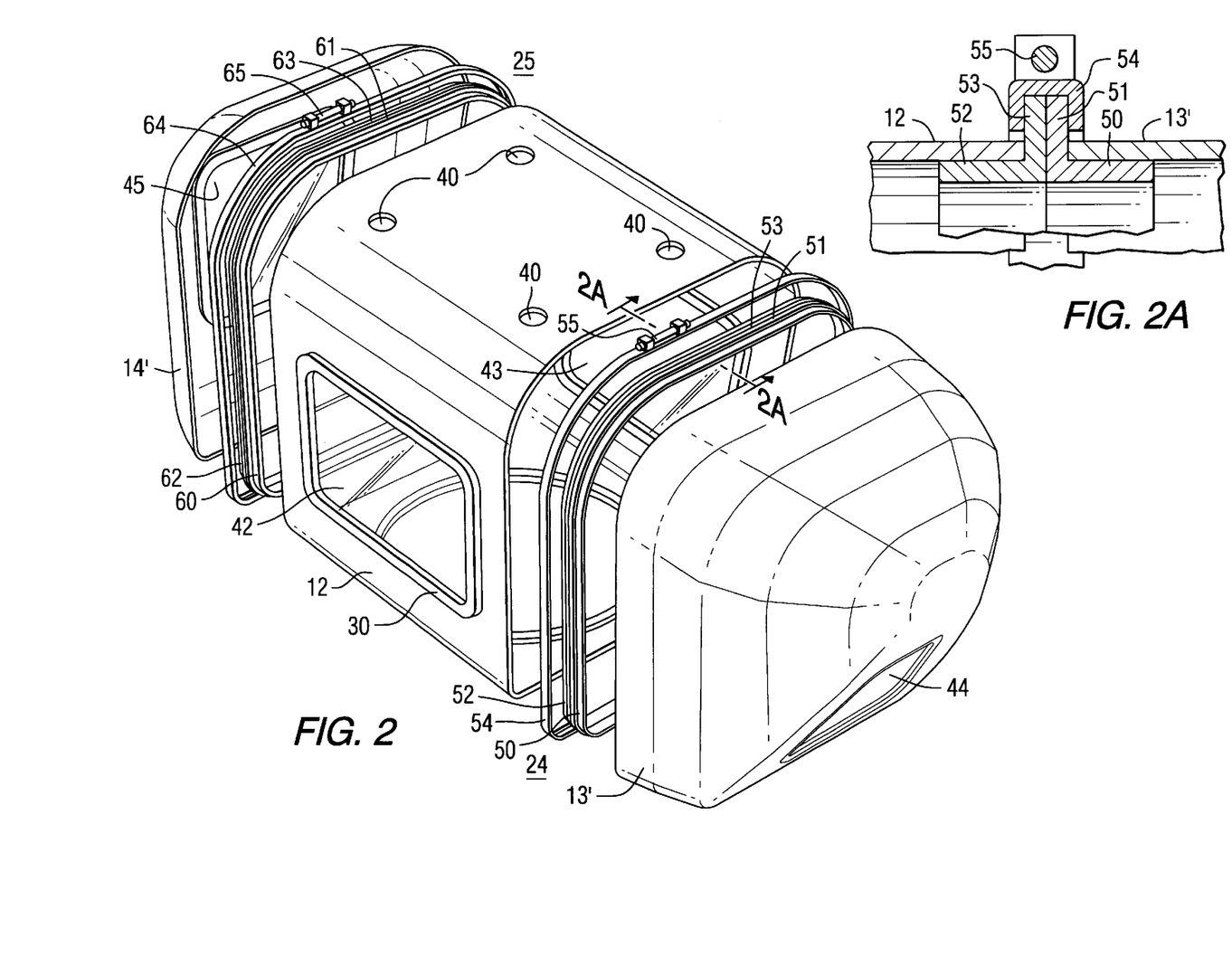
FIG. 2 is an exploded view of a pod with different window arrangements.
FIG. 2A is a view along line 2A—2A of FIG. 2.

In an identical manner the clamping ring arrangement 25 includes a former ring 60 affixed to end section 14', and having an upstanding flange 61. A complementary former ring 62 is affixed to middle section 12, and includes an upstanding flange 63. A U-shaped clamp 64 completely surrounds the upstanding flanges 61 and 63 and draws them, and consequently the middle and end sections 12 and 14', together when bolt 65 is tightened.

Figure 3:
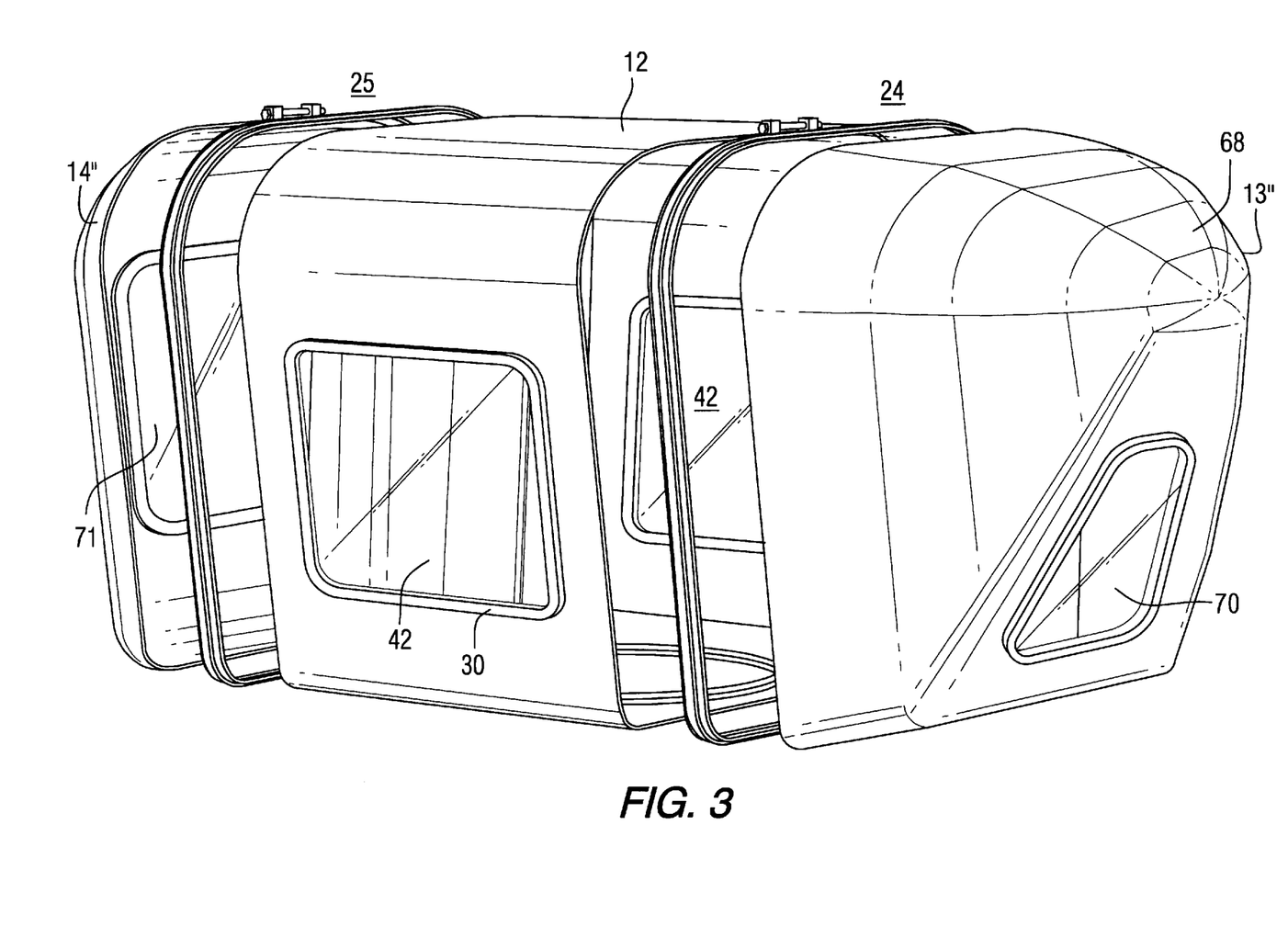
FIG. 3 is an exploded view of another pod configuration.

FIG. 3 illustrates a pod arrangement which includes end sections 13" and 14", selected from the suite of end sections, and wherein end section 13" includes a more pronounced nose portion 68 than end section 13' of FIG. 2. This particular shape may be used to accommodate a somewhat larger sensor in the forward portion of the pod. In addition, end sections 13" and 14" also include respective transparent windows 70 and 71.

Figure 4:
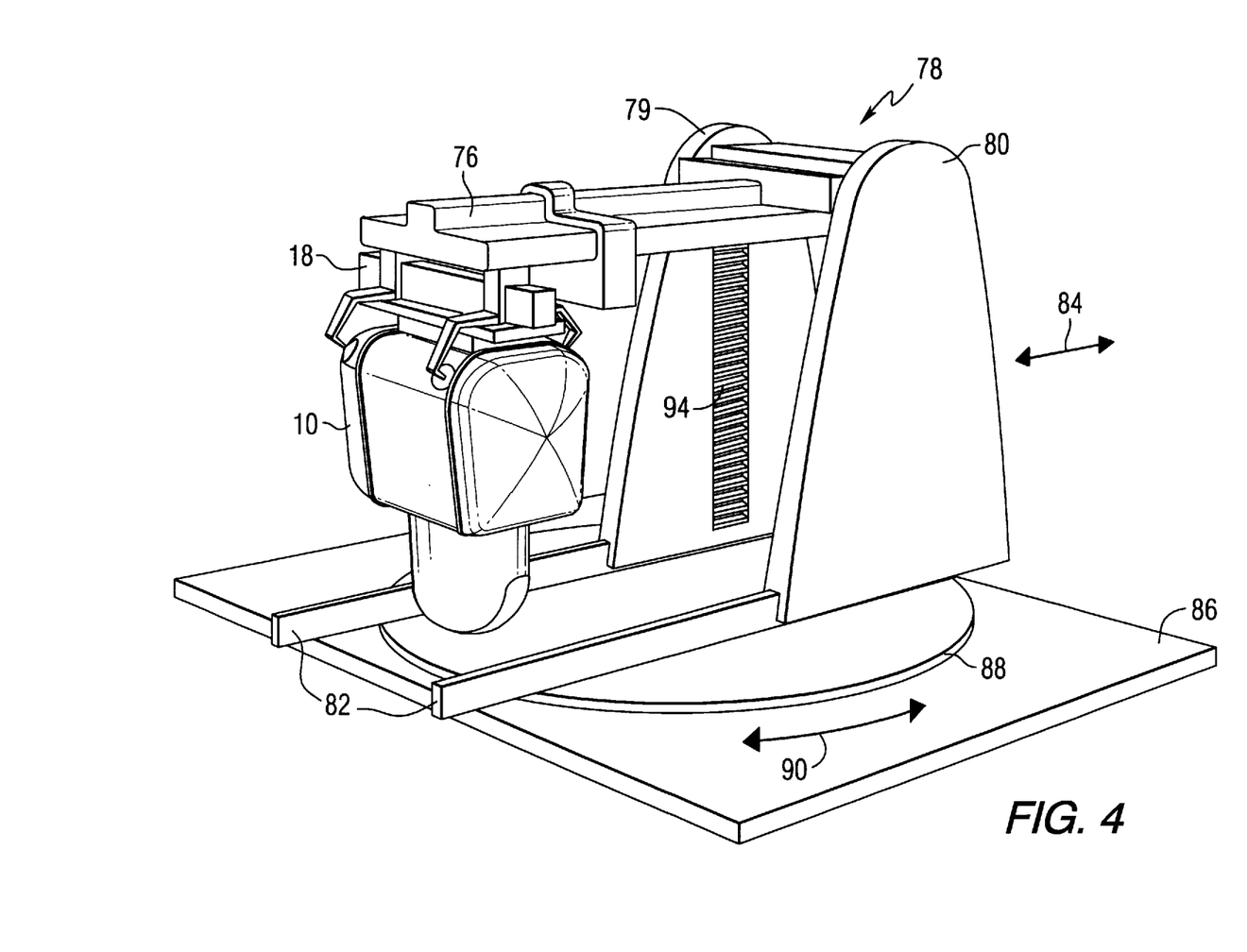
FIG. 4 is a view of a pod deployment arrangement.

The pod may be assembled on the ground before a mission, or, by the nature of its design, may be assembled in the air while enroute to an area of interest. Typically the aircraft would carry a suite of sensors, inserts and end sections to accommodate potential mission changes. When approaching the area of interest, the pod may be deployed from the aircraft, obtain desired data at the area of interest and then be retrieved back into the aircraft. Thereafter the pod may be reconfigured for another mission while in flight, or the aircraft may return to base. The deployment and retrieval function is performed by a deployment arrangement which is illustrated in FIG. 4.

The deployment arrangement 78 includes a pod support arm 76 having an outer end to which is attached the pod 10 by means of the mounting yoke 18. The inner end of pod support arm 76 is connected to a moveable carriage assembly 78 having first and second sides 79 and 80 mounted on rails 82 so that the carriage assembly 78 is moveable horizontally in the directions of arrow 84. The rails 82 may be mounted on a base such as pallet 86, or optionally, as illustrated in FIG. 4, on a rotary table 88 moveable in the directions of arrow 90, and lockable at a desired position.

Figure 5:
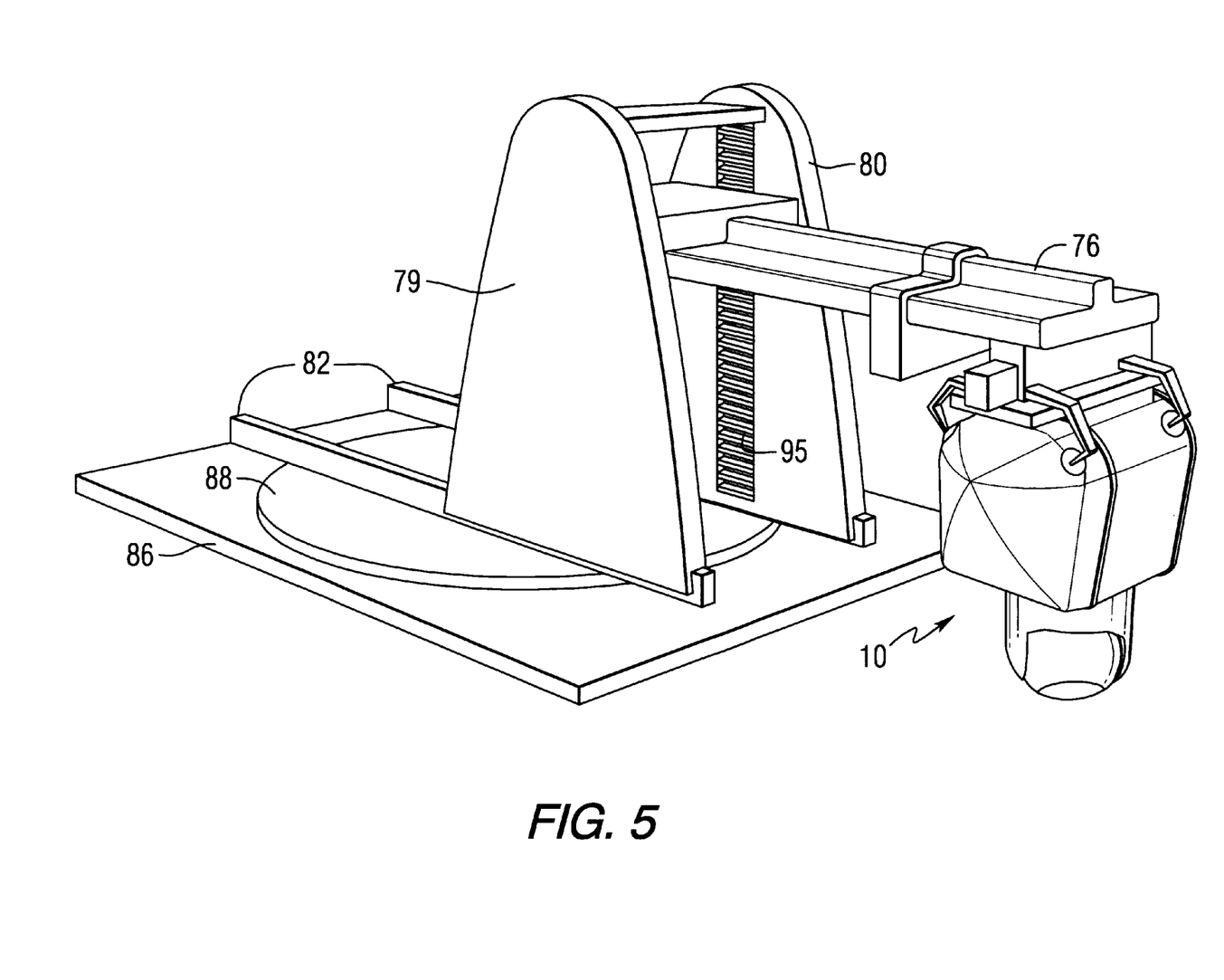
FIGS. 5 and 6 illustrate the pod in a deploying condition.
Figure 6:
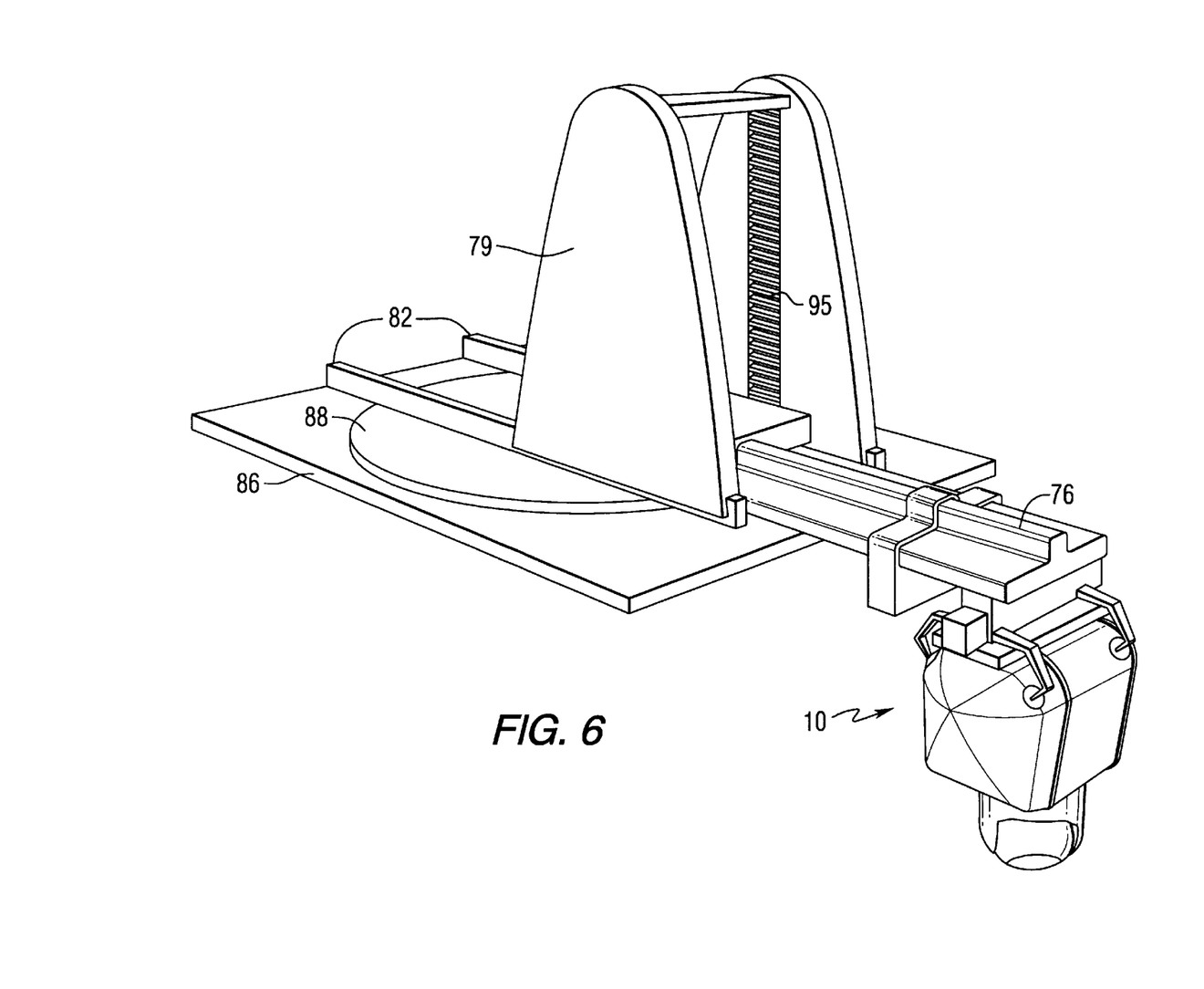

With additional reference to FIG. 5, the sides 79 and 80 include respective vertical tracks 94 and 95 by means of which the inner end of pod support arm 76 can be lowered and raised vertically by a motor (not illustrated) or by hand cranking. FIG. 5 illustrates a deployment situation wherein the carriage has been moved to its extreme end along rails 82 and the pod support arm 76, along with pod 10, has commenced lowering. FIG. 6 illustrates the apparatus in its fully deployed position, which may be out the side door of an aircraft such as illustrated in FIG. 7.

Figure 7:
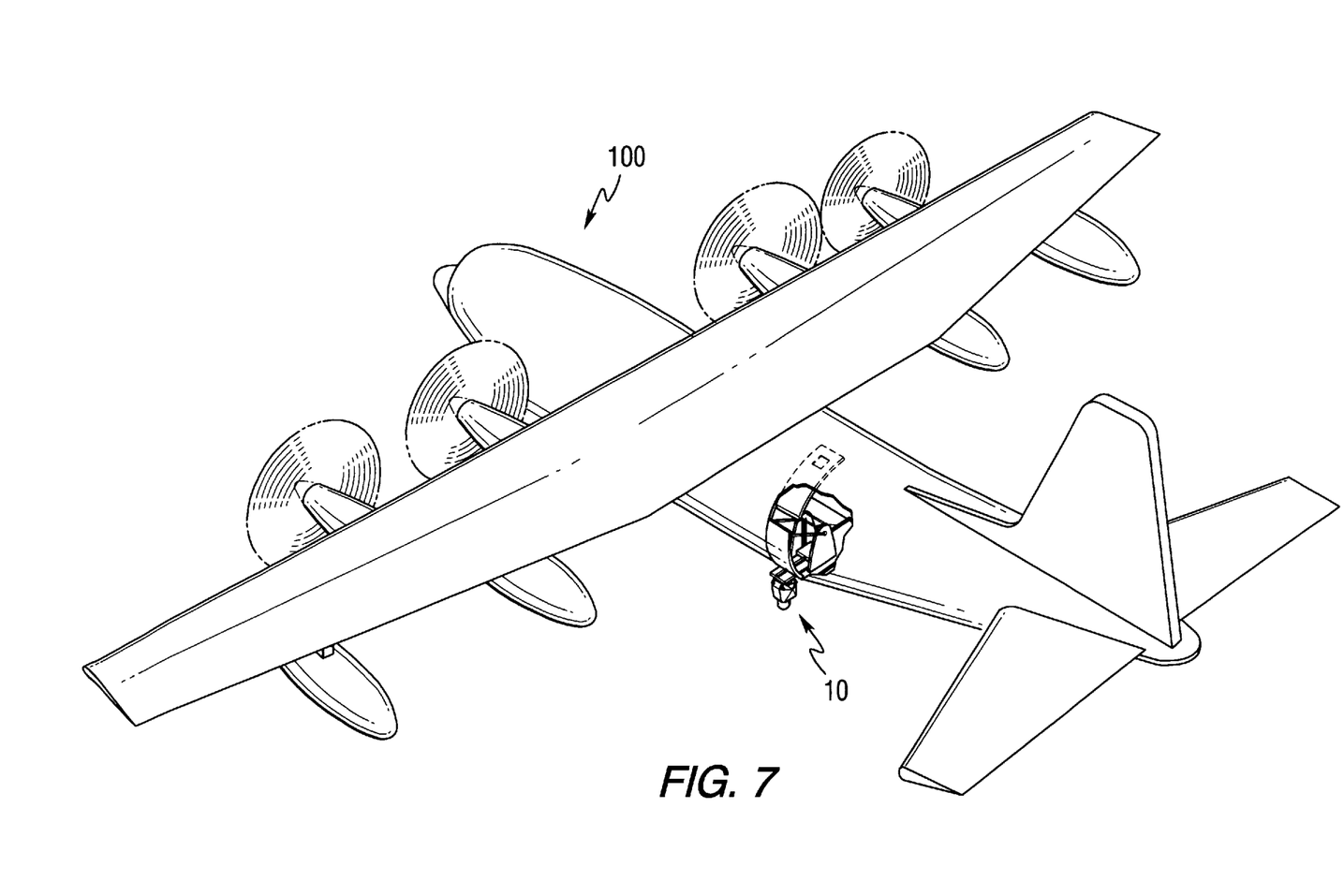
FIG. 7 illustrates the apparatus on board a large aircraft.

FIG. 7 shows a relatively large aircraft 100 having a deployed sensor-carrying pod 10 hanging out the side. A closer view of the deployment arrangement 74 within the aircraft 100 is illustrated in the broken-away view of FIG. 8. Prior to arriving at the mission site, the pallet 86 is secured to the floor of the aircraft 100 and the remainder of the deployment arrangement 74 is attached. At low altitudes the aircraft door 102 is moved up on its track and the pod 10 is deployed into the airstream through the door opening.

Figure 8:
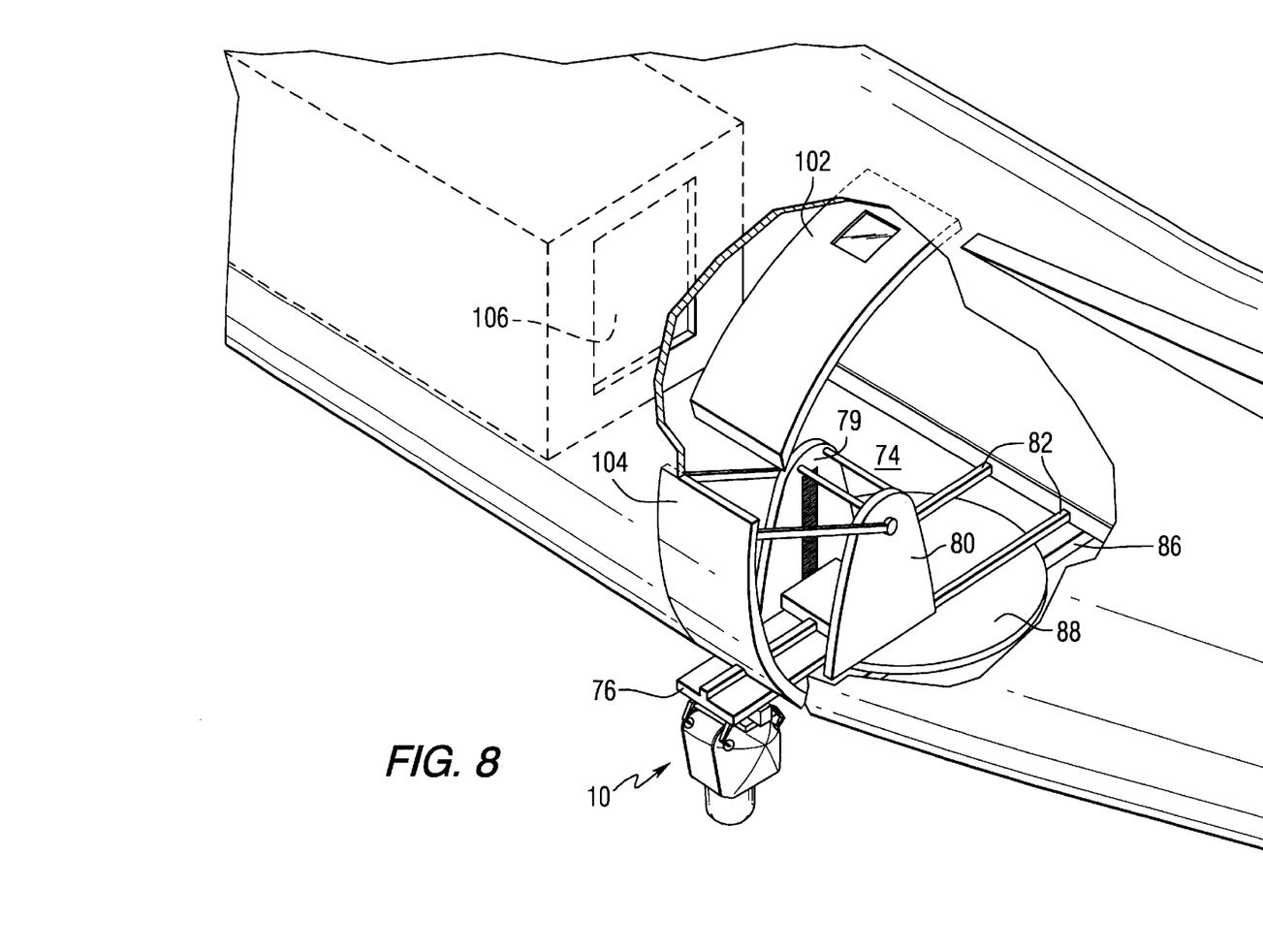
FIG. 8 is a closer view of the apparatus of FIG. 7.

The door 102 may remain open for low altitude missions, however it may be necessary to go to altitudes which require aircraft pressurization. For this purpose a closure 104, suitably notched to fit over the pod support arm 76, seals the door opening. Alternatively, the door 102 itself may be suitably modified to perform this function. With aircraft having doors on both sides, the rotary table 88 would allow for the deployment out either door.

Also shown in FIG. 8 is a cargo container 106 which houses all of the equipment used for and by the pod 10, as well as operator manned control consoles. The concept is to put everything needed for one or more missions within the container. This reduces the need for outside storage space, reduces on-hand inventory requirements and keeps everything associated with the pod in one central location.

It will be readily seen by one of ordinary skill in the art that the present invention fulfills all of the objects set forth herein. After reading the foregoing specification, one of ordinary skill in the art will be able to effect various changes, substitutions of equivalents and various other aspects of the present invention as broadly disclosed herein. It is therefore intended that the protection granted hereon be limited only by the definition contained in the appended claims and equivalents. Having thus shown and described what is at present considered to be the preferred embodiments of the present invention, it should be noted that the same has been made by way of illustration and not limitation. Accordingly, all modifications, alterations and changes coming within the spirit and scope of the present invention are herein meant to be included.

What is claimed is:

1. A reconfigurable reconnaissance pod system adapted to be carried by an aircraft having a floor, comprising:
    a pod having an interior for placement of predetermined sensors selected from a suite of sensors;
    said pod including a middle section and first and second end sections connected to said middle section and selected from a suite of end sections, as a function of particular sensors used within said pod;
    said middle section including at least one frame defining an aperture, and a frame insert selected from a suite of inserts, as a function of particular sensors used within said pod;
    at least some of said suite of end sections including a) end sections having a window to transmit visible light wavelengths, b) end sections having a window to transmit wavelengths other than visible light and c) end sections having no window; and
    a deployment arrangement for deploying and retrieving said pod from said aircraft, said deploying arrangement comprising:
    a pod support arm having outer and inner ends;
    said pod being connected to said outer end of said pod support arm;
    a moveable carriage assembly;
    said inner end of said pod support arm being connected to said moveable carriage assembly and adapted to move vertically in said moveable carriage assembly;
    a base, said base including a pallet for securing to the floor of said aircraft and a rotary table mounted on said pallet;
    first and second rails carried by said rotary table; and
    said moveable carriage assembly being mounted for horizontal movement on said rails.

2. A pod system according to claim 1 wherein:
    said middle and end sections are of a composite material.

3. A pod system according to claim 1 wherein:
    said middle and end sections are of aluminum.

4. A pod system according to claim 1 wherein:
    said end sections are connected to said middle section by means of quick disconnect clamp rings.

5. A pod system according to claim 4 which includes:
a strongback member;
said middle section being secured to said strongback member.

6. A pod system according to claim 5 which includes:
a mounting yoke;
said strongback member being secured to said mounting yoke.

7. A pod system according to claim 6 wherein:
said mounting yoke includes a plurality of depending arms having ends which contact said pod.

8. A pod system according to claim 7 which includes:
cushion elements at the ends of said arms of said mounting yoke.

9. A reconfigurable reconnaissance pod system adapted to be carried by an aircraft having a floor, comprising:
a pod having an interior for placement of predetermined sensors selected from a suite of sensors; and
a deployment arrangement for deploying and retrieving said pod from said aircraft, said deploying arrangement comprising:
a pod support arm having outer and inner ends;
said pod being connected to said outer end of said pod support arm;
a moveable carriage assembly;
said inner end of said pod support arm being connected to said moveable carriage assembly and adapted to move vertically in said moveable carriage assembly in vertical tracks;
a base;
first and second rails carried by said base; and
said moveable carriage assembly being mounted for horizontal movement on said rails, said moveable carriage extending through no more than one opening in said aircraft when deploying said pod.

10. A pod system according to claim 9 wherein said base includes a pallet for securing to the floor of said aircraft, said base includes a rotary table mounted on said pallet; said rails being carried by said rotary table.

11. A pod system according to claim 9, said pod including a middle section and first and second end sections connected to said middle section and selected from a suite of end sections, as a function of particular sensors used within said pod;
said middle section including at least one frame defining an aperture, and a frame insert selected from a suite of inserts, as a function of particular sensors used within said pod;
at least some of said suite of end sections including a) end sections having a window to transmit visible light wavelengths, b) end sections having a window to transmit wavelengths other than visible light and c) end sections having no window.

12. A pod system according to claim 11 wherein said end sections are connected to said middle section by means of quick disconnect clamp rings.

13. A pod system according to claim 11 includes a strongback member; said middle section being secured to said strongback member.

14. A pod system according to claim 13 which includes a mounting yoke; said strongback member being secured to said mounting yoke.

15. A pod system according to claim 14 wherein said mounting yoke includes a plurality of depending arms having ends which contact said pod.

16. A pod system according to claim 15 which includes cushion elements at the ends of said arms of said mounting yoke.

* * * * *